(12) United States Patent
Lee et al.

(10) Patent No.: US 11,355,127 B2
(45) Date of Patent: Jun. 7, 2022

(54) ELECTRONIC APPARATUS AND CONTROLLING METHOD THEREOF

(71) Applicant: SAMSUNG ELECTRONICS CO., LTD., Suwon-si (KR)

(72) Inventors: Sungjun Lee, Suwon-si (KR); Seongwook Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 16/713,482

(22) Filed: Dec. 13, 2019

(65) Prior Publication Data

US 2020/0194008 A1 Jun. 18, 2020

(30) Foreign Application Priority Data

Dec. 14, 2018 (KR) .......................... 10-2018-0162205

(51) Int. Cl.
| | |
|---|---|
| *G10L 17/22* | (2013.01) |
| *G10L 17/02* | (2013.01) |
| *G10L 17/06* | (2013.01) |
| *G10L 17/00* | (2013.01) |
| *H04L 29/06* | (2006.01) |

(Continued)

(52) U.S. Cl.
CPC .............. *G10L 17/22* (2013.01); *G06F 3/167* (2013.01); *G06F 21/32* (2013.01); *G06F 21/85* (2013.01); *G10L 17/00* (2013.01); *G10L 17/02* (2013.01); *G10L 17/06* (2013.01); *H04L 63/0861* (2013.01); *G10L 15/22* (2013.01)

(58) Field of Classification Search
CPC ......... G10L 17/22; G10L 17/00; G10L 17/02; G10L 17/06; G10L 15/22; G06F 21/85; G06F 3/167; G06F 21/32; H04L 63/0861

USPC ........................................................ 704/235
See application file for complete search history.

(56) References Cited

U.S. PATENT DOCUMENTS

| | | | |
|---|---|---|---|
| 9,262,612 B2 | 2/2016 | Cheyer | |
| 9,690,542 B2 * | 6/2017 | Reddy | ..................... G06F 3/167 |

(Continued)

FOREIGN PATENT DOCUMENTS

| | | |
|---|---|---|
| JP | 2017-191991 | 10/2017 |
| KR | 10-2002-0057262 | 7/2002 |

(Continued)

OTHER PUBLICATIONS

Search Report and Written Opinion dated Mar. 17, 2020 in counterpart International Application No. PCT/KR2019/017635.

*Primary Examiner* — Edwin S Leland, III
(74) *Attorney, Agent, or Firm* — Nixon & Vanderhye P.C.

(57) ABSTRACT

An electronic apparatus and a controlling method thereof are provided. The electronic apparatus includes a communication interface comprising communication circuitry, a memory, and a processor. The processor is configured to control the electronic apparatus to: receive a user voice for controlling an external device connected to the electronic apparatus from a user terminal through the communication interface, perform user authentication by comparing feature information obtained from the user voice with feature information pre-stored in the memory, obtain a control command for controlling the external device by analyzing the user voice based on the user being authenticated, and control the communication interface to transmit the control command to the external device.

16 Claims, 10 Drawing Sheets

(51) Int. Cl.
*G06F 21/85* (2013.01)
*G06F 3/16* (2006.01)
*G06F 21/32* (2013.01)
*H04L 9/40* (2022.01)
*G10L 15/22* (2006.01)

(56) References Cited

U.S. PATENT DOCUMENTS

| | | | |
|---|---|---|---|
| 9,978,260 B2 | 5/2018 | Lee et al. | |
| 10,762,904 B2 | 1/2020 | Toma et al. | |
| 10,652,286 B1* | 5/2020 | George | H04L 67/306 |
| 10,916,244 B2 | 2/2021 | Kim et al. | |
| 2012/0245941 A1* | 9/2012 | Cheyer | H04L 63/10 |
| | | | 704/246 |
| 2014/0167931 A1* | 6/2014 | Lee | H04L 12/2818 |
| | | | 340/12.5 |
| 2014/0230018 A1* | 8/2014 | Anantharaman | H04L 63/0861 |
| | | | 726/4 |
| 2015/0088514 A1* | 3/2015 | Typrin | G06F 3/167 |
| | | | 704/249 |
| 2016/0098991 A1* | 4/2016 | Luo | G10L 15/08 |
| | | | 455/563 |
| 2017/0242651 A1* | 8/2017 | Lang | G06F 3/165 |
| 2018/0033438 A1* | 2/2018 | Toma | G10L 17/00 |
| 2018/0210710 A1* | 7/2018 | Roman | H04L 12/2816 |
| 2018/0253281 A1* | 9/2018 | Jarvis | G10L 15/222 |
| 2018/0277112 A1* | 9/2018 | Kim | G06F 3/165 |
| 2020/0194008 A1* | 6/2020 | Lee | G06F 21/32 |

FOREIGN PATENT DOCUMENTS

| | | |
|---|---|---|
| KR | 10-2003-0033890 | 5/2003 |
| KR | 10-2014-0079328 | 6/2014 |
| KR | 10-2017-0099903 | 9/2017 |
| KR | 10-2018-0012055 A | 2/2018 |
| KR | 10-1874946 | 7/2018 |
| KR | 10-2018-0107637 A | 10/2018 |
| WO | 2012/129231 | 9/2012 |

* cited by examiner

ELECTRONIC APPARATUS AND CONTROLLING METHOD THEREOF

CROSS-REFERENCE TO RELATED APPLICATION

This application is based on and claims priority under 35 U.S.C. § 119 to Korean Patent Application No. 10-2018-0162205, filed in Dec. 14, 2018, in the Korean Intellectual Property Office, the disclosure of which is incorporated by reference herein in its entirety.

BACKGROUND

1. Field

The disclosure relates to an electronic apparatus and a controlling method thereof. For example, to an electronic apparatus capable of performing user authentication based on a user voice to control an external device and controlling the external device and a controlling method thereof.

2. Description of Related Art

Recently, a technology which allows a user to control a home network system using an external user terminal has been provided. In this case, if the home network system is controlled simply through user authentication within the external user terminal and the user terminal is hacked or stolen, the security of the home network system can be vulnerable. In addition, if the home network system is controlled through a UI provided by a user terminal, a user may feel inconvenience due to the complicated UI configuration.

Meanwhile, an artificial intelligence (AI) system has been used in various fields. The AI system, unlike conventional rule-based smart systems, is a system in which machine learns and makes decisions by itself and becomes smarter. As the AI system is used, the recognition rate is improved and it becomes possible to more accurately understand the user's preference. Thus, the existing rule-based smart system is gradually replaced by a deep learning-based AI system.

SUMMARY

Embodiments of the disclosure relate to an electronic apparatus that performs user authentication based on a user voice to control an external device connected to the electronic apparatus to improve security and easily control the external device and a controlling method thereof.

An electronic apparatus according to an example embodiment includes a communication interface comprising communication circuitry, a memory configured to store at least one command, and a processor configured to execute the at least one command to control the electronic apparatus to: receive a user voice for controlling an external device connected to the electronic apparatus from a user terminal through the communication interface, perform user authentication by comparing feature information obtained from the user voice with feature information pre-stored in the memory, obtain a control command for controlling the external device by analyzing the user voice based on the user being authenticated, and control the communication interface to transmit the control command to the external device.

In addition, a method of controlling an electronic apparatus according to an example embodiment includes receiving a user voice for controlling an external device connected to the electronic apparatus from a user terminal, performing user authentication by comparing feature information obtained from the user voice with pre-stored feature information, obtaining a control command for controlling the external device by analyzing the user voice based the user being authenticated, and transmitting the control command to the external device.

According to the above-described various example embodiments, as the electronic apparatus directly performs user authentication, it is possible to address the vulnerability of the security of a home network system that can control a device inside the home through an external user terminal, and by performing user authentication using a user voice for controlling an external device, it is possible to perform user authentication conveniently without much effect of the user.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
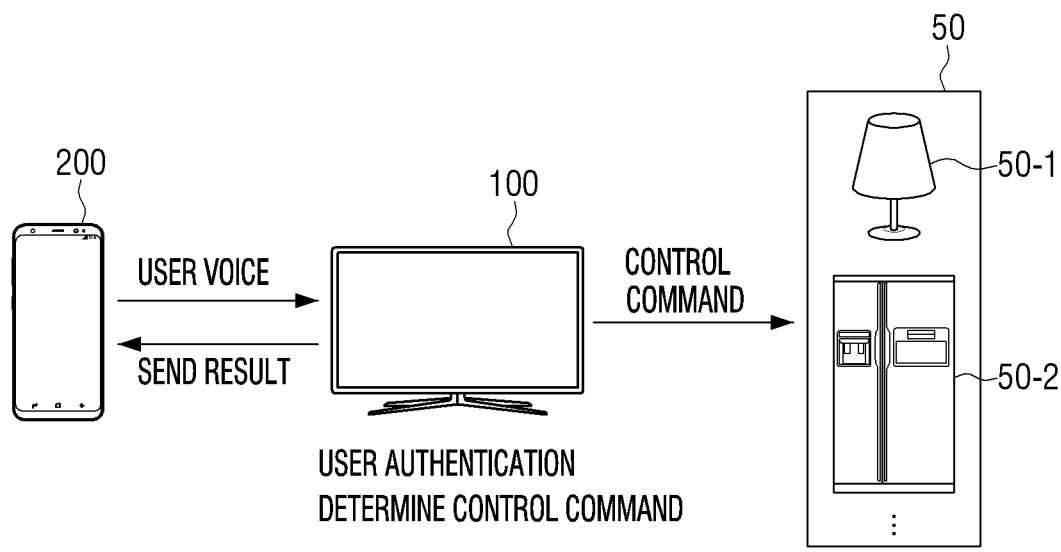
FIG. 1A is a diagram illustrating an example home network system for performing user authentication based on a user voice to control an external device according to an embodiment.

Hereinafter, various example embodiments of the disclosure will be described. However, it is to be understood that technologies mentioned in the disclosure are not limited to specific embodiments, but include all modifications, equivalents, and/or alternatives according to embodiments of the disclosure.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the description, the term "at least one of A or/and B" may include all possible combinations of the items that are enumerated together. For example, the term "at least one of A or/and B" may include (1) including at least one A, (2) including at least one B, or (3) including both at least one A and at least one B.

Expressions "first", "second", or the like, used in the disclosure may indicate various components regardless of a sequence and/or importance of the components, may be used to distinguish one component from the other components, and do not limit the corresponding components. For example, a first user device and a second user device may indicate different user devices regardless of a sequence or importance thereof. For example, the first component described in the disclosure may be named the second component and the second component may also be similarly named the first component, without departing from the scope of the disclosure.

In the present disclosure, a 'module' or a 'unit' performs at least one function or operation and may be implemented by hardware or software or a combination of the hardware and the software. In addition, a plurality of 'modules' or a plurality of 'units' may be integrated into at least one processor (not illustrated) except for 'modules' or 'units' that should be realized in a specific hardware.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component). On the other hand, when it is mentioned that any component (for example, a first component) is "directly coupled with/to" or "directly connected to" to another component (for example, a second component), it is to be understood that the other component (for example, a third component) is not present between any component and another component.

An expression "configured (or set) to" used in the disclosure may be used interchangeably with an expression "suitable for", "having the capacity to", "designed to", "adapted to", "made to", or "capable of" depending on a situation. A term "configured (or set) to" may not necessarily refer only to being "specifically designed to" in hardware. Instead, an expression "an apparatus configured to" may refer to the apparatus being "capable of" together with other apparatuses or components. For example, a "processor configured (or set) to perform A, B, and C" may refer, for example, and without limitation, to a dedicated processor (for example, an embedded processor) for performing the corresponding operations, a generic-purpose processor (for example, a central processing unit (CPU), an application processor) that may perform the corresponding operations by executing one or more software programs stored in a memory device, or the like.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even though they are defined in the disclosure.

Hereinafter, the disclosure will be described in greater detail with reference to the drawings. However, in describing the disclosure, when it is decided that a detailed description for the known functions or configurations related to the disclosure may unnecessarily obscure the gist of the disclosure, the detailed description thereof may be omitted. Throughout the accompanying drawings, similar components will be denoted by similar reference numerals.

FIG. 1A is a diagram illustrating an example home network system for performing user authentication based on a user voice to control an external device according to an embodiment. As illustrated in FIG. 1, a home network system may include an electronic apparatus 100, a user terminal 200 and an external device 50. In this example, the electronic apparatus 100 may be configured to control the external device 50 in the home network system, which is illustrated as a TV in FIG. 1A, but this is only an example and the disclosure is not limited thereto. The electronic apparatus 100 may be implemented in various ways, such as, for example, and without limitation, as a home gateway device, home appliances (e.g., digital video disk (DVD) players, audios, refrigerators, air conditioners, cleaners, ovens, microwave ovens, washing machines, air cleaners, robot cleaners, set-top boxes, home automation control panels, door locks, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames, etc.), or the like. The user terminal 200 may be configured to control an electronic apparatus of a home network system or an external device, which is illustrated as a smartphone in FIG. 1A, but this is only an example and the disclosure is not limited thereto. The user terminal 200 may be implemented, for example, and without limitation, as tablet personal computers, mobile phones, video phones, artificial intelligence speakers, speakers (speakers including at least one microphone and network module (with no artificial intelligence function)), e-book readers, laptop personal computers, netbook computers, personal digital assistants (PDAs), portable multimedia players (PMPs), MP3 players, mobile medical devices, cameras, wearable devices, or the like. The external device 50 may be configured to form a home network system, which is illustrated as a light 50-1, a refrigerator 50-2, etc., but this is only an example, and the disclosure is not limited thereto. The external device 50 may, for example, and without limitation, be implemented as home appliances, Internet of things, or the like.

The user terminal 200 may execute or activate an application for controlling the external device 50 of a home network system according to a user command. For example, if a user command is input while an application is not executed before the user command is input, the user terminal 200 may execute the application according to the user command, and if a user command is input while an application is already been executed before the user command is input or while an application is in an inactive state (when the application is executed in the background, the user terminal 200 may activate the application according to the user command. The user command may, for example, include a user input for selecting an icon corresponding to an application, but this is only an example, and the disclosure is not limited thereto. The user command may, for example, include a user voice including a specific word (e.g., Bixby) or a user input for selecting a specific button, but the disclosure is not limited thereto.

In this example, the user terminal 200 may be a device which is authenticated in advance by the electronic apparatus 100 through an application to control the external device 50 of a home network system. In other words, the user terminal 200 may be a device that has performed an authentication operation with the electronic apparatus 100 through an application.

If an application is executed or activated, the user terminal 200 may perform communication with the electronic apparatus 100. However, this is only an example, the user terminal 200 may perform communication with the electronic apparatus 100 before an application is executed or activated.

The user terminal 200 may receive a user voice to control the external device 50 of a home network system through a microphone while an application is executed. In this example, the user terminal 200 may receive a user voice within a predetermined time, for example, while or after touching an icon displayed on an application while the application is executed.

Once a user voice is input, the user terminal 200 may transmit the user voice to the electronic apparatus 100. In this example, the user terminal 200 may transmit the user voice to the electronic apparatus 100 before converting the user voice into a text. In other words, the user terminal 200 may transmit the user voice itself to the electronic apparatus 100 before the user voice is converted into a text and the electronic apparatus 100 located in the house recognizes the user voice received from the user terminal 200. Thus, unlike other data packets, in order to generate another command by modulating the user voice transmitted from the user terminal 200, a hacker needs to make a command with a human voice, and modulating the user voice command is very difficult unless the human voice is accurately reproduced. Accordingly, by transmitting a user voice itself to the electronic apparatus 100, the method and apparatus of present disclosure may strengthen security. In addition, the user voice is not leaked to the outside, so personal privacy can be enhanced, and since an external server does process the user voice, the processing speed is fast and the network situation with the external server is not encountered.

Further, the user terminal 200 may transmit biometric information of a user along with a user voice to the electronic apparatus 100. For example, the biometric information may be biometric information of a user such as, for example, and without limitation, fingerprint information, iris information, face information, and the like. In this example, the user terminal 200 may encrypt the biometric information of the user using the first function and transmit the encrypted biometric information to the electronic apparatus 100.

The electronic apparatus 100 may perform user authentication based on the received user voice. For example, the electronic apparatus 100 may compare feature information obtained from the user voice and pre-stored feature information to perform user authentication. For example, the electronic apparatus 100 may compare the feature information obtained from the user voice (e.g., frequency features for each phoneme) with feature information corresponding to each of a plurality of users and authenticate one user from among the plurality of users. In another example, the electronic apparatus 100 may authenticate a user by inputting a user voice to an AI model which is trained based on user voices to authenticate users.

In addition, the electronic apparatus 100 may perform additional user authentication based on the biometric information which is received along with the user voice. For example, the electronic apparatus 100 may decrypt the encrypted biometric information using a second function, and compare the decrypted biometric information with pre-stored biometric information to perform user authentication. However, it will be understood that various types of authentication may be performed and the disclosure is not limited to the examples described herein.

Once user authentication is performed, the electronic apparatus 100 may analyze a user voice and obtain a control command corresponding to the user voice. In this example, the electronic apparatus 100 may analyze the user voice in the form of natural language using the interactive system. For example, the electronic apparatus 00 may analyze the user voice based on the interactive system and determine a device to be controlled and a control command.

Further, the electronic apparatus 100 may determine a device to be controlled and a control command based on user information of an authenticated user. For example, if an authenticated user is user A, and the voice of "turn on the air conditioner in my room" is input, the electronic apparatus 100 may determine a device to be controlled (e.g., an air conditioner in the room of user A) and a control command (e.g., a user's preferred temperature) based on the user information of user A.

The electronic apparatus 100 may transmit the determined control command to the external device 50 which is determined to be a device to be controlled. The electronic apparatus 100 may transmit a control command through a communication module such as, for example, and without limitation, Bluetooth, etc. The external device 50 may perform an operation of the external device 50 based on the control command received from the electronic apparatus 100.

The electronic apparatus 100 may transmit a result of understanding the user voice and a control result to the user terminal 200.

If user authentication is not performed, the electronic apparatus 100 may transmit a message informing that a user is not authenticated to the user terminal 200. Once the message is received, the user terminal 200 may provide the received message through an application.

Figure 1B:
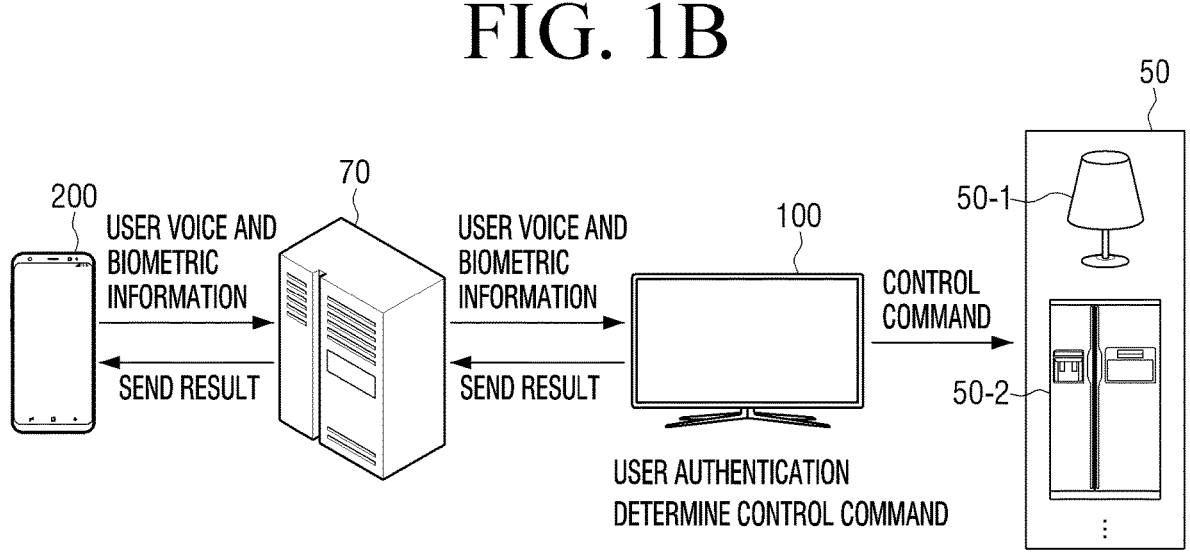
FIG. 1B is a diagram illustrating an example home network system for performing user authentication based on a user voice to control an external device according to another embodiment.

FIG. 1A illustrates that the user terminal 200 and the electronic apparatus 100 communicate with each other directly, but this is only an example. As illustrated in FIG. 1B, the user terminal 200 and the electronic apparatus 100 may perform communication through an external server 70 via a wireless network. For example, the user terminal 200 may transmit the received user voice and biometric information to the electronic apparatus 100 through the external server 70. In addition, the electronic apparatus 100 may transmit the determined control command to the user terminal 200 through the external server 70.

As described above, by performing user authentication based on the user command to control the external device 50, not only can the security of the home network system be improved, but also the external device 50 can be controlled more easily.

Meanwhile, according to various example embodiments, the electronic apparatus 100 may recognize a user corresponding to a user voice using the user voice as input data of a trained AI model. In this disclosure, the trained AI model may be established in consideration of the application fields of the recognition model or computer performance of the device. The trained AI model, for example, may be a model a neural network. The AI model may be designed to simulate a human brain structure on a computer and may include a plurality of network nodes having weighted values that simulate neurons in a human neural network. The plurality of network nodes may form a connection relationship so that neurons simulate the synaptic activity of neurons that send and receive signals through synapses. In this example, the trained AI model, for example, may include, for example, and without limitation, a neural network model, a deep learning model developed from the neural network model, or the like. In the deep learning model, a plurality of network nodes may be located at different depths (or layers) and exchange data according to a convolutional connection relationship. Examples of the trained AI model include, for example, and without limitation, Deep Neural Network (DNN), Recurrent Neural Network (RNN), Bidirectional Recurrent Deep Neural Network (BRDNN), and the like, but are not limited thereto.

In addition, the electronic apparatus 100 may use an AI agent to determine a control command corresponding to the above-described user voice. In this example, the AI agent may, for example, include a dedicated program for providing AI-based service (e.g., a voice recognition service, a secretary service, a translation service, a search service, etc.), and may be executed by an existing general purpose processor (e.g., CPU) or a separate AI dedicated processor (e.g., graphics-processing unit (GPU), etc.), or the like. For example, the AI agent may control the various modules (e.g., an interactive system) which will be described later. Meanwhile, the AI agent may control various devices or modules which will be described later in detail.

Figure 2:
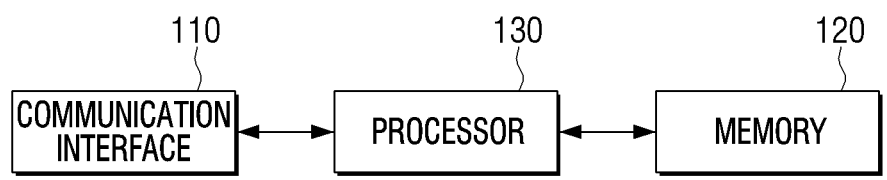
FIGS. 2 and 3 are block diagrams illustrating example configurations of an example electronic apparatus according to an embodiment.

FIG. 2 is a block diagram illustrating and example configuration of an electronic apparatus according to an embodiment. As illustrated in FIG. 2, the electronic apparatus 100 may include a communication interface (e.g., including communication circuitry) 110, a memory 120 and a processor (e.g., including processing circuitry) 130, but is not limited thereto. Some elements may be added or omitted depending on the type of the electronic apparatus.

The communication interface 110 may include various communication circuitry and may be configured to perform communication with an external device. The communication connection of the communication interface 110 with an external device may, for example, and without limitation, be performed through a third device (e.g., a relay device, a hub, an access point, a server, a gateway, etc.).

For example, the communication interface 110 may perform communication with the external user terminal 200, and perform communication with the external device 50. In this example, the communication interface 110 may perform communication using the user terminal 200 and a first communication module (e.g., a WiFi module, a wireless communication module, etc.), and may perform communication with the external device 50 and a second communication module (e.g., a Bluetooth module, an infrared communication module, etc.).

For example, the communication interface 110 may receive at least one of a user terminal control command and encrypted biometric information from the user terminal 200, and may transmit a control command to the external device 50.

The memory 120 may store a command or data related to at least one another element of the electronic apparatus 100. For example, the memory 120 may be implemented, for example, and without limitation, as a non-volatile memory, a volatile memory, a flash memory, a hard-disk drive (HDD), a solid state drive (SSD), etc. The memory 120 may be accessed by the processor 130, and reading/recording/modifying/deleting/updating of the data can be performed by the processor 130. In this disclosure, the term of memory may include the memory 120, a ROM (not illustrated) in the processor 130, a RAM (not illustrated), or a memory card (not illustrated) (e.g., a micro SD card or a memory stick) mounted on the electronic apparatus 100. In addition, the memory 120 may store programs, data, etc. for configuring various screens to be displayed on a display area of a display.

Further, the memory 120 may store an AI agent for operating an interactive system. For example, the electronic apparatus may use the AI agent to generate natural language in response to user speech. In this example, the AI agent may, for example, include a dedicated program for providing AI-based services (e.g., a voice recognition service, a secretary service, a translation service, a search service, etc.). For example, the AI agent may be executed by a conventional general purpose processor (e.g., CPU) or a separate AI dedicated processor (e.g., GPU, Neural Processing Unit (NPU), Visual Processing Unit (VPU)), or the like, which will be described in detail with reference to FIG. 4.

In addition, the memory 120 may store an AI model which is trained for performing user authentication based on a user voice.

The processor 130 may include various processing circuitry and be electrically connected to the memory 120 and control the overall operations and functions of the electronic apparatus 100. For example, by executing at least one command stored in the memory 120, the processor 120 may receive a user command for controlling the external device 50 connected to the electronic apparatus 100 from the user terminal 200 through the communication interface 110. The processor may compare the feature information obtained from the user voice with the feature information pre-stored in the memory to perform user authentication. Once a user is authenticated, the processor 130 may analyze the user voice to obtain a control command to control the external device 50. The processor 130 may control the communication interface 110 to transmit the control command to the external device 50.

For example, the processor 130 may the user terminal 200 in advance through an application for controlling the external device 50 installed on the user terminal 200. In this example, the processor 130 may authenticate the user terminal 200 in advance using various authentication information (e.g., user communication information, biometric information, etc.).

The processor 130 may receive a user voice which may be input while an application is executed on the user terminal 200 through the communication interface 110. In this example, the user voice may include a user command to control the external device 50. In addition, the processor 130 may receive the user's encrypted biometric information along with the user voice through the communication interface 110.

For example, the processor 130 may not transmit the received user voice to an external server, and obtain a text corresponding to the user voice through a voice recognition module stored in the memory 120.

The processor 130 may perform user authentication based on the received user voice. For example, the processor 130 may extract feature information from the user voice and compare the extracted feature information with the pre-stored feature information to authenticate a user. In this example, the processor 130 may compare the feature information obtained from the received user voice with the feature information corresponding to each of a plurality of users stored in the memory to authenticate one user from among the plurality of users.

In addition, the processor 130 may perform user authentication based on the encrypted biometric information along with the received user voice. For example, the processor 130 may decrypt the encrypted biometric information received along with the user voice and compare the decrypted biometric information with the pre-stored biometric information to perform user authentication.

Once a user is authenticated, the processor 130 may analyze the user voice to determine a device to be controlled from among at least one external device, and may determine a control command. In this example, the processor 130 may determine a device to be controlled and a control command based on the authenticated user information. For example, the processor 130 may analyze the user voice based on the interactive system and determine a device to be controlled and a control command.

If it is not possible to determine at least one of a device to be controlled and a control command, the processor 130 may transmit a message for confirming a device to be controlled or a control command which has not been determined to the user terminal 200. In this example, the processor 130 may determine a device to be controlled or a control command which has not been determined based on an additional user voice in response to the received message.

If a user is not authenticated from at least one of the user's biometric information and the user voice, the processor 130 may control the communication interface 110 to transmit a message informing that the user is not authenticated, to the user terminal 200.

Figure 3:
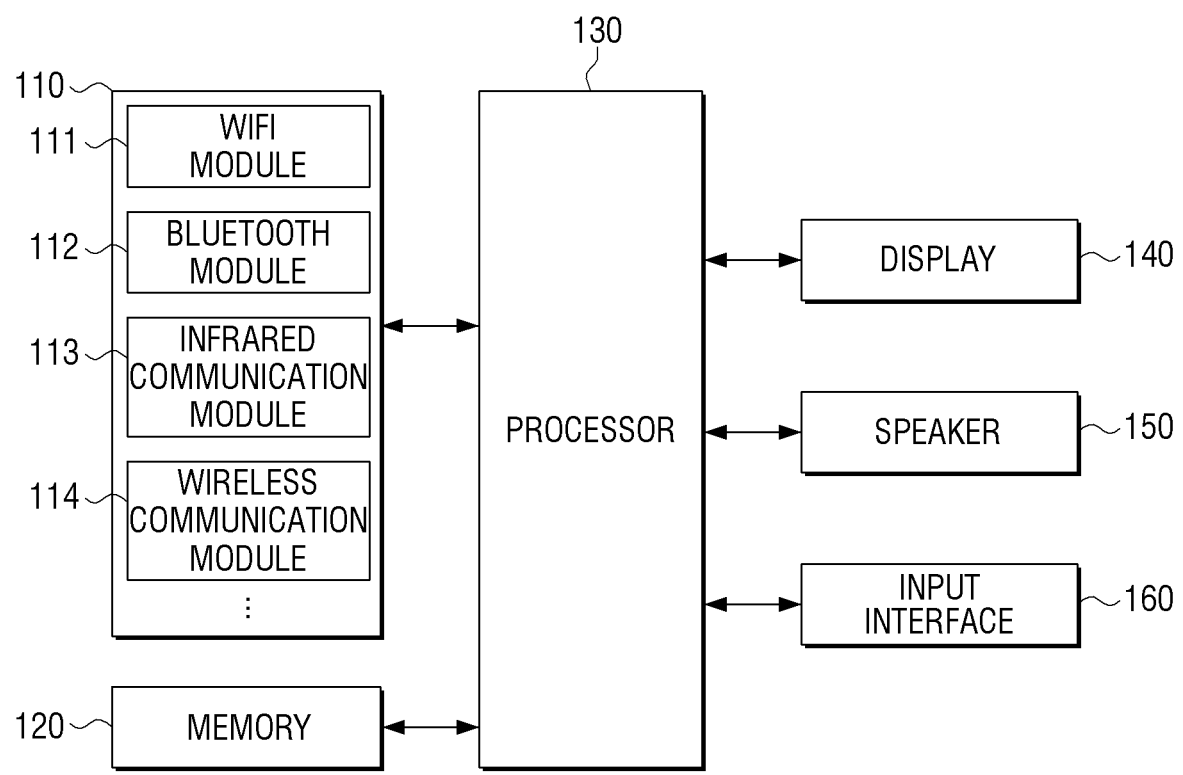

FIG. 3 is a block diagram illustrating an example configuration of an electronic apparatus according to an embodiment. As illustrated in FIG. 3, the electronic apparatus 100 may include the communication interface (e.g., including communication circuitry) 110, the memory 120, a display 140, a speaker 150, an input interface (e.g., including input circuitry) 160, and the processor (e.g., including processing circuitry) 130. The communication interface 110, the memory 120 and the processor 130 illustrated in FIG. 3 have been described with reference to FIG. 2, overlapping descriptions may not be repeated here. In addition, some elements may be added or omitted depending on the type of the electronic apparatus. For example, if the electronic apparatus 100 is implemented as a home gateway device, the display 140 may be omitted, and if the electronic apparatus 100 is implemented as one of IoT devices, a sensor, a microphone, and the like may be further added.

The communication interface 110 may include various communication circuitry and may be configured to perform communication with various types of external devices according to various types of communication methods. The communication interface 110 may include various modules including various communication circuitry, such as, for example, and without limitation, a WiFi module 111, a Bluetooth module 112, an infrared communication module 113, a wireless communication module 114, etc. The processor 130 may perform communication with various external devices using the communication interface 110. The external device may include, for example, and without limitation, a display device such as a TV, an image processing device such as a set-top box, an external server, a control device such as a remote controller, a sound output device such as a Bluetooth speaker, a lighting device, a smart cleaner, a home appliance such as a smart refrigerator, a server such as an IoT home manager, etc., but the disclosure is not limited thereto.

The WiFi module 111, the Bluetooth module 112 may perform communication according to a WiFi method and a Bluetooth method, respectively. When using the WiFi module 111 or the Bluetooth module 122, a variety of connection information such as SSID, session keys and the like, may be first transmitted and received, communication is connected using the connection information, and a variety of information may then be transmitted and received.

The infrared communication module 113 may perform communication according to Infrared Data Association (IrDA) technology that may transmit data wirelessly at a short distance using infrared rays between the time light and the millimeter wave.

The wireless communication module 114 may include at least one communication chip that performs communication according to various wireless communication standards such as Zigbee, 3rd generation (3G), 3rd generation partnership project (3GPP), long term evolution (LTE), 4th generation (4G), 5th generation (5G), and the like.

The other communication interface 110 may include at least one of a local area network (LAN) module or an Ethernet module and at least one of wired communication modules performing communication using a pair cable, a coaxial cable, an optical fiber cable, or the like.

According to an embodiment, the communication interface 110 may use the same communication module (e.g., a WiFi module) to communicate with an external device such as a remote controller and an external server. According to another embodiment, the communication interface 110 may use a different communication module to communicate with an external device such as a remote controller and an external server. For example, the communication interface 110 may use at least one of the Ethernet module or the WiFi module to communicate with the external server, and may use a BT module to communicate with the external device such as the remote controller.

In addition, according to an embodiment, the communication interface 110 may user the same communication module (e.g., a WiFi module) to communicate with the external user terminal 200 and the external device 50. According to another embodiment, the communication interface 110 may user a different communication module to communicate with the external user terminal 200 and the external device 50. For example, the communication interface 110 may use at least one of the Ethernet module and the WiFi module to communicate with the external user terminal 200, and may user the BT module to communicate with the external device 50 in a home network system.

The display 140 may display an image or a UI received from the outside. For example, the display 140 may be implemented as various types of displays such as, for example, and without limitation, Liquid Crystal Display (LCD), Organic Light Emitting Diodes (OLED) display, Plasma Display Panel (PDP), etc. In addition, the display 140 may also include a driving circuit, a backlight unit, and the like which may be implemented in the form of an a-si TFT, a low temperature poly silicon (LTPS) TFT, and an organic TFT (OTFT). The display 140 may be implemented as a touch screen combined with a touch sensor, a flexible display, a 3D display, and the like. In addition, according to an embodiment, the display 140 may include not only a display panel which outputs images but also a bezel which houses the display panel. For example, a bezel according to an embodiment may include a touch sensor (not illustrated) for sensing a user interaction.

The speaker 150 may be configured to output not only various audio data received from the outside but also various alarm sounds, voice messages, and the like. In this example, the electronic apparatus 100 may include an audio output device such as the speaker 150, or may include an output device such as an audio output terminal.

The input interface 160 may include various input circuitry and may be configured to receive a user command to control the electronic apparatus 100. For example, the input interface 160 may be implemented as a device including input circuitry such as, for example, and without limitation, a button, a touch pad, a mouse or a keyboard, or the like, or may be implemented as a touch screen capable of performing the above-described display function and manipulation input function. The button may be various types of buttons such as a mechanical button, a touch pad, a wheel, etc. which are formed on a certain area of the front, side, or real of the external surface of the main body of the electronic apparatus 100.

The processor 130 may include various processing circuitry, such as, for example, and without limitation, one or more of central processing unit (CPU), Micro Controller Unit (MCU), micro processing unit (MPU), controller, application processor (AP), communication processor (CP), ARM processor, or the like, or may be defined as the corresponding term. In addition, the processor 130 may be implemented as System on Chip (SoC) or large scale integration (LSI) having a processing algorithm, or may be implemented in the form of Field Programmable gate array (FPGA). The processor 130 may perform various functions by executing computer executable instructions stored in the memory 120. In addition, the processor 130 may include, for example, and without limitation, at least one of a graphics-processing unit (GPU), a neural processing unit (NPU), a visual processing unit (VPU), or the like which are separate AI-dedicated processors including various processing circuitry and/or executable program elements, for performing an artificial intelligence function.

Figure 4:
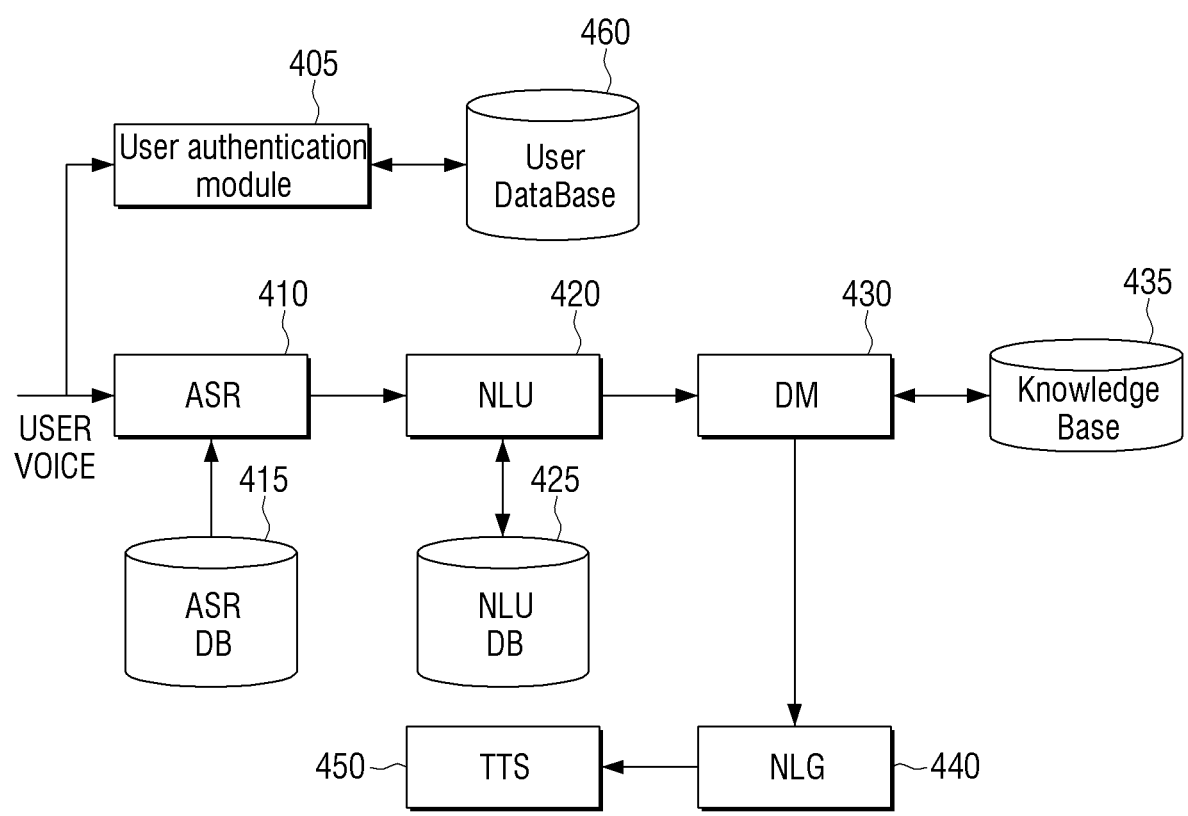
FIG. 4 is a block diagram illustrating an example interactive system of an AI agent system according to an embodiment.

FIG. 4 is a block diagram illustrating an example interactive system of an AI agent system according to an embodiment. An interactive system 400 illustrated in FIG. 4 may be configured to conduct a conversation with a virtual AI agent through natural language, and according to an embodiment, the interactive system 400 may be stored in the memory 130 of the electronic apparatus 100. However, this is only an example, and at least one included in the interactive system 400 may be included in at least one external server.

As illustrated in FIG. 4, the interactive system 400 may include user authentication module (e.g. including processing circuitry and/or executable program elements) 405, automatic speech recognition (ASR) module (e.g. including processing circuitry and/or executable program elements) 410, natural language understanding (NLU) module (e.g. including processing circuitry and/or executable program elements) 420, dialogue manager (DM) module (e.g. including processing circuitry and/or executable program elements) 430, natural language generator (NLG) module (e.g. including processing circuitry and/or executable program elements) 440, and text to speech (TTS) module (e.g. including processing circuitry and/or executable program elements) 450. The interactive system 400 may further include a path planner module (e.g. including processing circuitry and/or executable program elements) or an action planner module (e.g. including processing circuitry and/or executable program elements), or the like.

The user authentication module 405 may include various processing circuitry and/or executable program elements and authenticate a user using a user voice received from the user terminal 200. For example, the user authentication module 405 may obtain feature information from the user voice. In this example, the user authentication module 405 may obtain the feature information regarding the user voice by analyzing frequency characteristics included in the user voice. For example, the electronic apparatus 100 may obtain frequency characteristics included in the user voice using feature extraction technologies such as, for example, and without limitation, Cepstrum, Linear Predictive Coefficient (LPC), Mel Frequency Cepstral Coefficient (MFCC), Filter Bank Energy, or the like. In this example, the frequency characteristics may be expressed as a speech feature vector, and may be expressed as a two-dimensional vector or more. In addition, the user authentication module 405 may obtain feature information by extracting the feature vector for each phoneme included in the user voice.

The user authentication module 405 may compare feature information pre-stored in user database 460 with the obtained feature information to authenticate a user. In this example, the user authentication module 405 may calculate or determine similarity by comparing the feature information corresponding to each of a plurality of users stored in the user database 460 with the obtained feature information, and may authenticate a user corresponding to the feature information with the highest similarity. In this example, the user authentication module 405 may also obtain user information regarding the user who is authenticated through the user database 460.

In addition, the user authentication module 405 may recognize a user by inputting a user voice to a trained AI model (e.g., DNN model). For example, the user authentication module 405 may obtain user information regarding the user voice by inputting feature information extracted from the user voice to the AI model which is trained to recognize the user based on the user voice.

If a user is authenticated through the user authentication module 405, the automatic speech recognition (ASR) module 410 may include various processing circuitry and/or executable program elements and perform a voice recognition operation regarding a user voice. However, this is only an example, while the user authentication module 405 authenticates a user, the ASR module 410 may perform a voice recognition operation regarding a user voice in a parallel manner.

The ASR module 410 may include various processing circuitry and/or executable program elements and convert the user voice received from the user terminal 200 into text data. For example, the ASR module 410 may include an utterance recognition module. The utterance recognition module may include an acoustic model and a language model. For instance, the acoustic model may include information related to speech, and the language model may include unit phoneme information and combination of unit phoneme information. The utterance recognition module may convert user utterance into text data using information related to speech and unit phoneme information. The information regarding the acoustic model and the language model, for example, may be stored in automatic speech recognition database (ASR DB) (415).

The natural language understanding (NLU) module 420 may include various processing circuitry and/or executable program elements and figure out (determine) a user intent regarding a user voice by performing, for example, syntactic analysis or semantic analysis. According to the syntactic analysis, a user input may be divided in grammatical units (e.g.: a word, a phrase, a morpheme, etc.), and it may be determined which grammatical element a divided unit has. The semantic analysis may be performed using semantic matching, rule matching, formula matching, etc. Accordingly, the NLU module 420 may obtain a domain, an intent, or a parameter (or a slot) which is necessary for expressing an intent regarding a user input. The intent or the parameter may include information regarding an external device that a user wishes to control from among at least one external device and information regarding a control command.

The NLU module 420 may, for example, determine the intent and the parameter of the user using a matching rule divided into the domain, the intent, and the parameter (slot) required to determine the intent. For example, one domain (e.g., alarm) may include a plurality of intents (e.g., alarm setting, alarm clearing, etc.), and one intent may include a plurality of parameters (e.g., time, number of repetitions, alarm sound, etc.). A plurality of rules may include, for example, one or more requisite element parameters. The matching rule may be stored in the natural language understanding database (NLU DB) 425.

The NLU module 420 may identify the meaning of word extracted from the user input using linguistic features (e.g., syntactic elements) such as morphemes and phrases, and determine the intent of the user by matching the identified meaning of the word with the domain and the intent. For example, the NLU module 420 may determine the intent of the user by calculating how much the word extracted from the user input is included in each domain and intent. According to an embodiment, the NLU module 420 may determine a parameter of the user input using a word on which the NLU module 420 bases to identify the intent. According to an example embodiment, the NLU module 420 may determine the intent of the user using the natural language recognition database 423 in which the linguistic features for identifying the intent of the user input are stored.

The NLU module 420 may determine the intent of the user using the user database 460. For example, the NLU module 420 may determine the intent of the user using the user information (e.g., preferred phrase, preferred content, contact list, music list, etc.). According to an embodiment, in addition to the NLU module 420, the automatic speech recognition module 410 may also recognize the speech of the user with reference to the user database 460.

The NLU module 420 may generate a path rule based on the intent and the parameter of the user input. For example, the NLU module 420 may select an app to be executed based on the intent of the user input and determine an operation to be performed in the selected app. The NLU module 420 may generate the path rule by determining a parameter corresponding to the determined operation. According to an embodiment, the path rule generated by the NLU module 420 may include information on an app to be executed, an operation to be executed in the app, and a parameter required to execute the operation.

The NLU module 420 may generate one path rule or a plurality of path rules based on the intent and the parameter of the user input. For example, the NLU module 420 may receive a path rule set corresponding to the electronic apparatus 100 from the path planner module, and determine the path rule by mapping the intent and the parameter of the user input to the received path rule set. In this example, the path rule may include information on an operation for performing a function of an app or information on a parameter required for executing the operation. In addition, the path rule may include an operation order of the app. The electronic apparatus may receive the path rule, select an app according to the path rule, and execute an operation included in the path rule in the selected app.

The NLU 420 may generate one path rule or a plurality of path rules by determining an app to be executed, an operation to be executed in the app, and a parameter required to execute the operation based on the intent and the parameter of the user input. For example, the NLU module 420 may generate the path rule by arranging the app to be executed and the operation to be executed in the app in the form of ontology or graph model according to the intent of the user input using the information of the electronic apparatus 100. The generated path rule may be stored in a path rule database through, for example, the path planner module. The generated path rule may be added to the path rule set of the database 425.

The NLU module 420 may select at least one of the plurality of generated path rules. For example, the NLU 420 may select an optimal path rule among the plurality of path rules. As another example, the NLU module 420 may select the plurality of path rules when only some of the operations are specified based on the user utterance. The NLU module 420 may determine one path rule among the plurality of path rules by an additional input of the user.

The dialog manager module 430 may include various processing circuitry and/or executable program elements and determine whether the intent of the user identified by the NLU module 420 is clear. For example, the dialogue manager module 430 may determine whether the intent of the user is clear based on whether the information of the parameter is sufficient. The dialogue manager module 430 may determine whether the parameter identified by the NLU module 420 is sufficient to perform the task. According to an embodiment, when the intent of the user is not clear, the dialogue manager module 430 may perform a feedback for requesting necessary information to the user. For example, the dialogue manager module 430 may perform a feedback for requesting information (e.g., a device to be controlled or a control command) on a parameter for identifying the intent of the user.

According to an embodiment, the dialogue manager module 430 may include a content provider module. When the content provider module may perform an operation based on the intent and the parameter identified by the NLU module 420, the content provider module may generate a result of performing the task corresponding to the user input.

According to another embodiment, the dialogue manager module 430 may provide a response to the user inquiry using a knowledge database 435 or the user database 460. In this example, the knowledge database 435 may be included in the electronic apparatus 100, but this is merely an example and the knowledge database 435 may be included in an external server.

The natural language generator module 440 may include various processing circuitry and/or executable program elements and change designated information into a text form. The information changed in the text form may be in the form of natural language utterance. The designated information may be, for example, information on an additional input, information for guiding completion of an operation corresponding to the user input, or information (e.g., feedback information for the user input) for guiding the additional input of the user. The information changed into the text form may be displayed on a display of the external user terminal 200 or may be changed into a speech form by the text-to-speech module 450.

The text-to-speech module 450 may include various processing circuitry and/or executable program elements and change information in the text form into information in the speech form. The text-to-speech module 450 may receive the information in the text form from the natural language generator module 440 and change the information in the text form into the information in the speech form to output the information in the speech form to the speaker.

The NLU module 420 and the dialog manager module 430 may be implemented as one module. For example, the NLU module 420 and the dialog manager module 430 may be implemented as a single module to determine the user's intent and parameter, and obtain a response (e.g., a path rule) corresponding to the determined user's intent and parameter.

Figure 5:
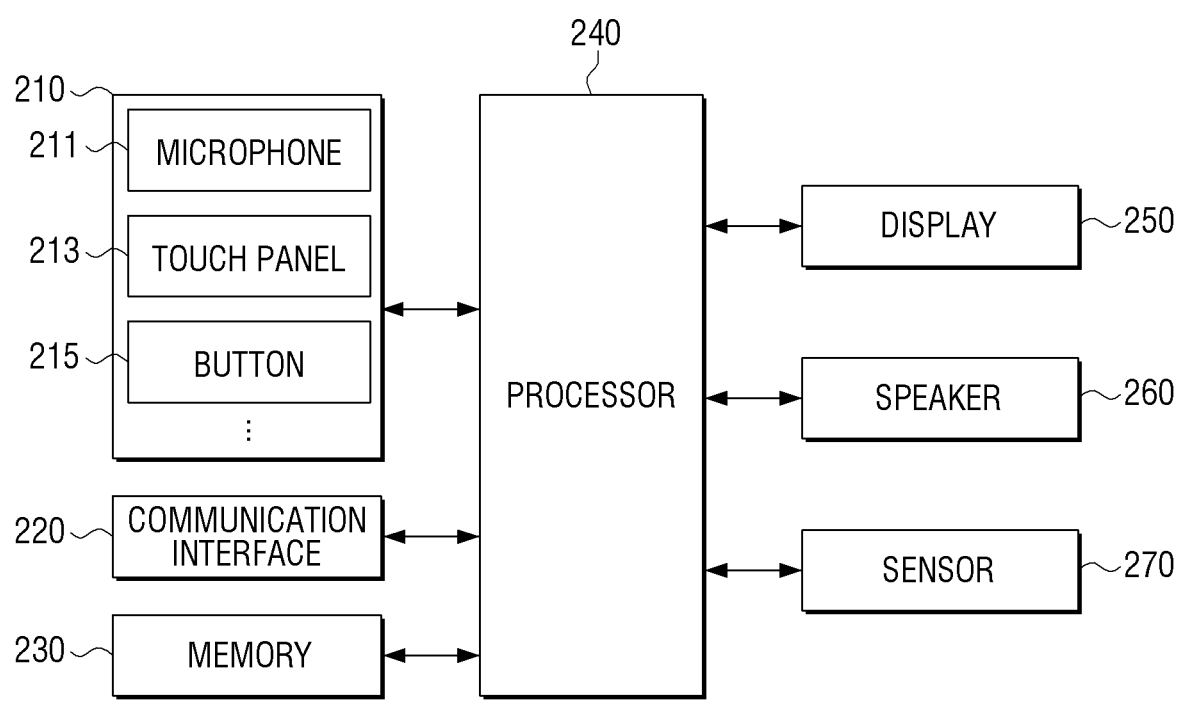
FIG. 5 is a block diagram illustrating an example configuration of a user terminal according to an embodiment.

FIG. 5 is a block diagram illustrating an example configuration of a user terminal according to an embodiment. As illustrated in FIG. 5, the user terminal 200 may include an input interface (e.g., including input circuitry) 210, a communication interface (e.g., including communication circuitry) 220, a memory 130, a display 250, a speaker 260, a sensor 270, and a processor (e.g., including processing circuitry) 240, but is not limited thereto. Some elements may be added or omitted depending on the type of user terminal. In addition, the element of the same name among the elements of the electronic apparatus 100 and the user terminal 200 may perform the same operation, overlapping description may not be repeated here.

The input interface 210 may include various input circuitry and receive a user input to control the user terminal 200. For example, the input interface 210 may receive various user manipulations such as, for example, and without limitation, a user touch, a user voice, etc. for controlling the user terminal 200. For example, the input interface 100 may receive a user voice for controlling the external device 50 of a home network system. The input interface 210 may include various input circuitry including, for example, and without limitation, a microphone 211, a touch panel 213, a button 215, or the like.

The communication interface 220 may include various communication circuitry and perform communication with the external electronic apparatus 100. The communication interface 220 communicating with the external electronic apparatus 100 may include communicating through a third device (e.g., a repeater, a hub, an access point, a server, or a gateway). For example, the communication interface 220 may transmit at least one of a user voice and the user's biometric information to the external electronic apparatus 100. In addition, the communication interface 220 may receive a message regarding the control result corresponding to the user voice from the external electronic apparatus 100.

The memory 230 may store a command or data related to at least one other element of the user terminal 200.

For example, the memory 230 may store an application for controlling a home network system. The user terminal 200 may perform an authentication operation with the external electronic apparatus 100 in advance through the application.

In addition, the memory 230 may store an AI agent for operating an interactive system.

The display 250 may display various information under the control of the processor 240. For example, the display 250 may display an execution screen of an application for controlling the external device 50, and may display a message received from the electronic apparatus 100.

The sensor 270 may detect various status information of the user terminal 200. For example, the sensor 270 may include, for example, and without limitation, a motion sensor (e.g., a gyro sensor, an acceleration sensor, etc.) that can detect motion information of the user terminal 200, and also, a sensor that can detect location information (e.g., a Global Positioning System (GPS) sensor), a sensor that can detect environment information around the user terminal 200 (e.g., a temperature sensor, a humidity sensor, an air pressure sensor, etc.), a sensor that can detect the user's biometric information of the user terminal 200. For example, the sensor 270 may include an image sensor to obtain face information, etc., an iris detection sensor to obtain iris information and a fingerprint detection sensor to obtain fingerprint information of the user. In addition, the sensor may include sensors to acquire various biometric information such as a blood pressure sensor to detect the user's blood pressure, a blood user sensor to detect the user's blood sugar level, an electrocardiogram sensor to detect the user's electrocardiogram, an electroencephalogram sensor to detect the user's brain wave, an EMG sensor to detect the user's muscle activity, etc.

The processor 240 may include various processing circuitry and be electrically connected to the memory 230 and control the overall operations and functions of the user terminal 200. For example, by executing at least one command stored in the memory 230, the processor 240 may execute (or activate) an application for controlling the external device 50 of a home network system according to a user input. When an application is executed, the processor 240 may control the display 250 to display the application execution screen. While the application is executed, the processor 240 may receive a user voice to control the external device 50 of the home network system through a microphone 211. The processor 240 may control the communication interface 220 to transmit the input user voice to the external electronic apparatus 100.

In addition, the processor 240 may control the communication interface 220 to transmit the user's biometric information acquired through the sensor 270 along with the user voice to the electronic apparatus 100. In this example, the processor 240 may perform encryption by the first function and transmit the same to the electronic apparatus 100.

The processor 240 may receive a message including a control result corresponding to the user voice from the electronic apparatus 100 through the communication interface 220. In addition, the processor 240 may receive a message to confirm a device to be controlled or a control command from the electronic apparatus 100 through the communication interface 220. The processor 240 may display the message received from the electronic apparatus 100 through the display 250 or may output the message which is natural language processed by the interactive system through the speaker 260.

Figure 6:
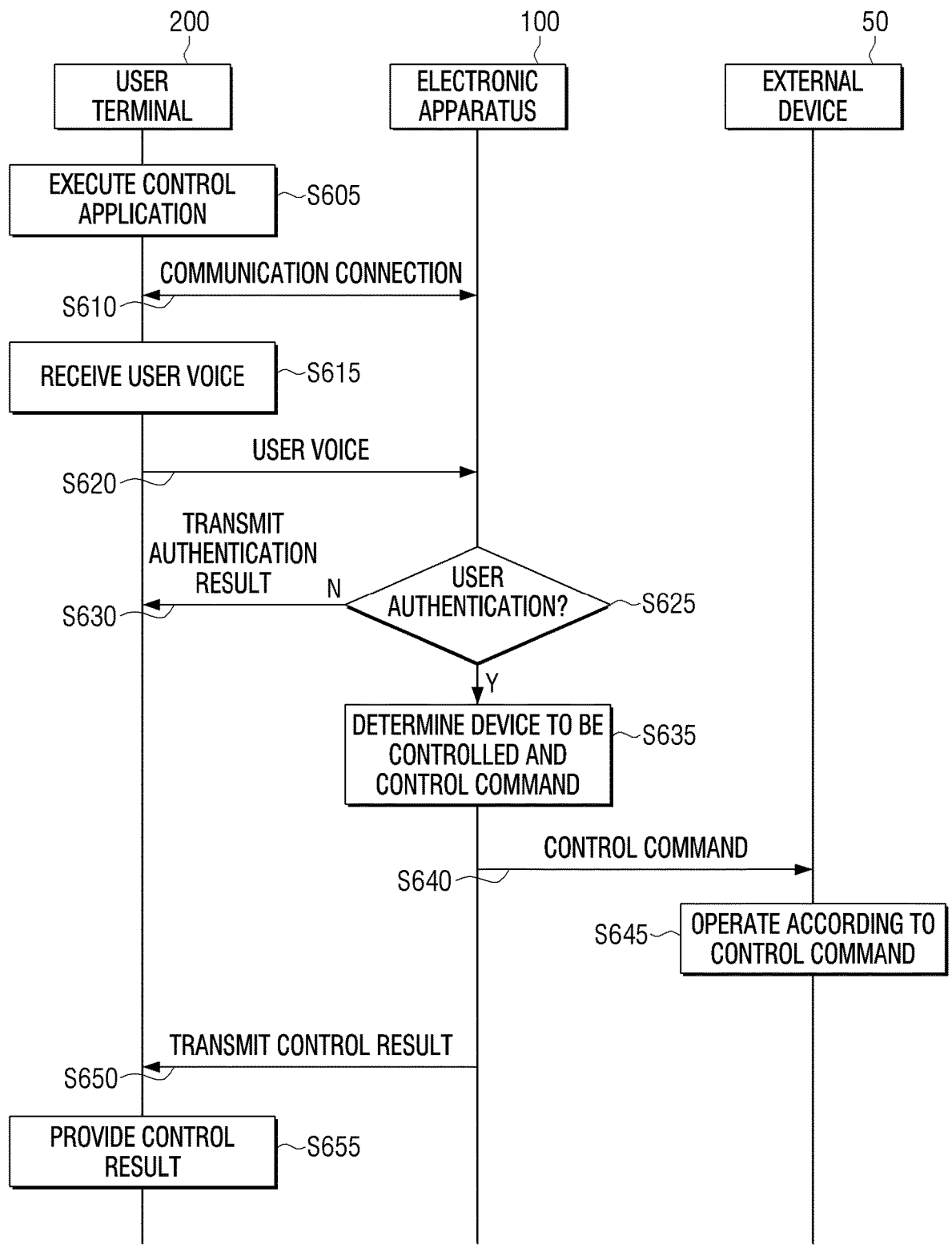
FIG. 6 is a sequence diagram illustrating an example method of performing user authentication based on a user voice to control an external device by a home network system according to an embodiment.

FIG. 6 is a sequence diagram illustrating an example method of performing user authentication based on a user voice to control an external device by a home network system according to an embodiment.

The user terminal 200 may execute a control application according to a user input (S605). In this case, the control application is an application for controlling a home network system, and the user terminal 200 may be previously authenticated to the electronic apparatus 100 through the control application.

Once the control application is executed, the user terminal 200 and the electronic apparatus 100 may perform a communication connection (S610). Alternatively, communication between the user terminal 200 and the electronic apparatus 100 may have already been established. In this case, the user terminal 200 may perform a communication connection directly with the electronic apparatus 100 using the first communication module (e.g., Bluetooth, BLE, Zigbee, etc.), but this is only an example. The user terminal 200 may perform a communication connection with the electronic apparatus 100 through an external server 70 using the second communication module (e.g., WiFi, LTE, 5F, etc.).

The user terminal 200 may receive a user voice (S615). For example, the user terminal 200 may receive a user voice to control the external device 50 while the control application is executed. For example, the user terminal 200 may receive a user voice such as "please turn on the air conditioner in my room" or "please record XXXX program on the TV in the living room."

In addition, in order to strengthen security, the user terminal 200 may obtain biometric information. In this example, the user terminal 200 may obtain biometric information when a user voice is input, but this is only an example. The user terminal 200 may obtain biometric information while biometric information to execute an application or an application is executed. In addition, the user terminal 200 may encrypt the obtained biometric information through the first function.

The user terminal 200 may transmit the obtained user voice to the electronic apparatus 100 (S620). In this example, the user terminal 200 may transmit the user voice to the electronic apparatus 100 directly without converting it to a text. In addition, the user terminal 200 may transmit encrypted biometric information along with the user voice.

The electronic apparatus 100 may perform user authentication based on the user voice (S625). For example, the electronic apparatus 100 may compare the feature information of the user voice and the pre-stored feature information and authenticate a user corresponding to the user voice. In this example, the electronic apparatus 100 may also obtain user information regarding the authenticated user. In addition, the electronic apparatus 100 may perform user authentication not only based on the user voice but also based on the encrypted biometric information. In this example, the electronic apparatus 100 may decrypt the encrypted biometric information through the second function, and may perform additional authentication using the decrypted biometric information.

If the user is not authenticated ("No" in operation S625), the electronic apparatus 100 may transmit the authentication result to the user terminal 200 (S630). For example, the electronic apparatus 100 may transmit a message indicating that the user is not authenticated to the user terminal 200.

If the user is authenticated ("Yes" in operation S625), the electronic apparatus 100 may determine a device to be controlled and a control command (S635). For example, if the user voice is "please record XXXX program on the TV in the living room", the electronic apparatus 100 may determine "the TV in the living room" as a device to be controlled using the interactive system illustrated in FIG. 4 and determine "record XXXX program" as a control command. In this example, the electronic apparatus 100 may determine a device to be controlled and a control command based on the user information regarding an authenticated user. For example, if the user vice is "please turn on the air conditioner in my room", the electronic apparatus 100 may determine "the air conditioner in my room" as a device to be controlled and "operate the air conditioner at 25 degrees which is the preferred temperature of user A" as a control command based on the authenticated user information. In addition, if one of a device to be controlled and a control command is not determined, the electronic apparatus 100 may transmit an inquiry message to the user terminal 200.

The electronic apparatus 100 may transmit a control command to the external device 50 which is the determined device to be controlled (S640). For example, the electronic apparatus 100 may transmit a control command, "please record XXXX program" to "the TV in the living room", and may transmit a control command, "please operate the air conditioner at 25 degrees" to "the air conditioner in room A."

The external device 50 may operate according to the control command (S645). For example, if the external device 50 is the TV in the living room, the external device 50 may perform the operation of recording "XXXX program", and if the external device 50 is "the air conditioner in room A", the external device 50 may operate the air conditioner at the set temperature of 25 degrees.

The electronic apparatus 100 may transmit a control result to the user terminal 200 (S650). For example, the electronic apparatus 100 may transmit a control result, "the TV in the living room will record XXXX program" or "The air conditioner in room A operates at 25 degrees."

The user terminal 200 may provide the control result received from the electronic apparatus 100 (S655).

Figure 7:
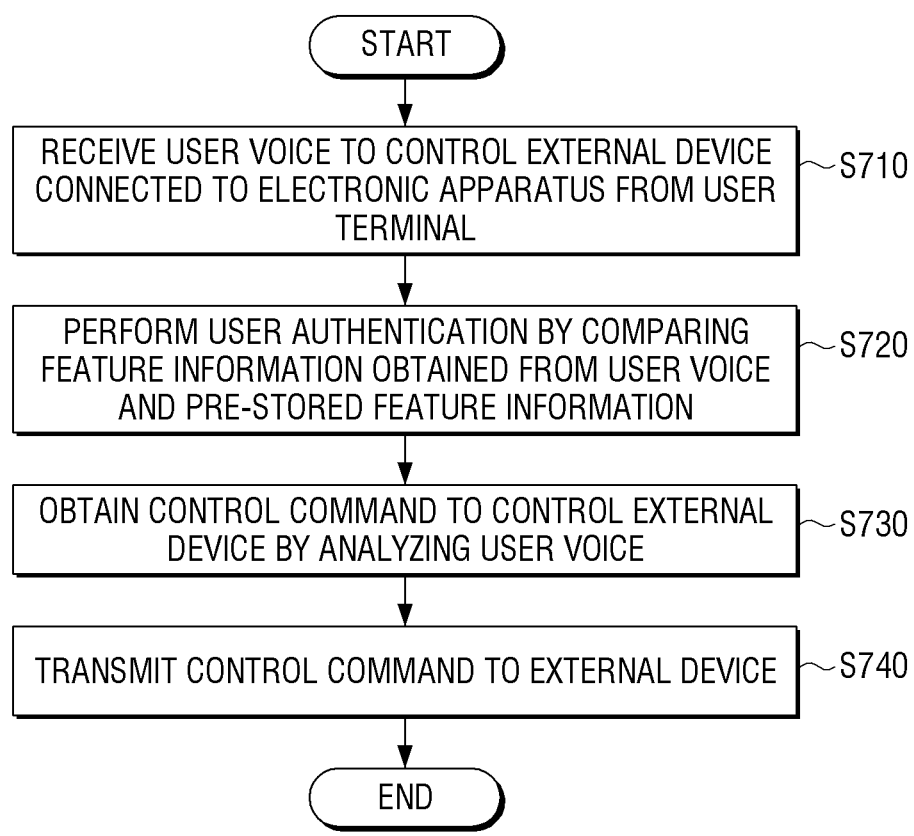
FIGS. 7 and 8 are flowcharts illustrating example methods of controlling an electronic apparatus according to various embodiments.

FIG. 7 is a flowchart illustrating an example method of controlling an electronic apparatus according to an embodiment.

The electronic apparatus 100 may receive a user voice to control the external device 50 from the user terminal 200 (S710). In this case, the user voice may be received through the pre-authenticated application of the user terminal 200.

The electronic apparatus 100 may compare the feature information obtained from the received user voice with the pre-stored feature information to perform user authentication (S720). For example, the electronic apparatus 100 may obtain feature information regarding the frequency feature of a user voice from the user voice, compare the pre-stored feature information corresponding to at least one user with the obtained feature information, and perform user authentication.

The electronic apparatus 100 may obtain a control command to control the external device 50 by analyzing the user voice (S730). In this example, the electronic apparatus 100 may not transmit the received user voice to an external server, obtain a text corresponding to the user voice through an automatic voice recognition module 410 stored in the memory 120, analyze the obtained text through the NLU module 420, and determine a device to be controlled and a control command.

The electronic apparatus 100 may transmit the control command to the external device 50 (S740). For example, the electronic apparatus 100 may transmit the determined control command to the external device 50 corresponding to the determined device to be controlled.

As described above, by controlling the external device 50 while performing user authentication through a user voice, the security of a home network system can be strengthened, and the external device 50 can be controlled more effectively through the user voice.

Figure 8:
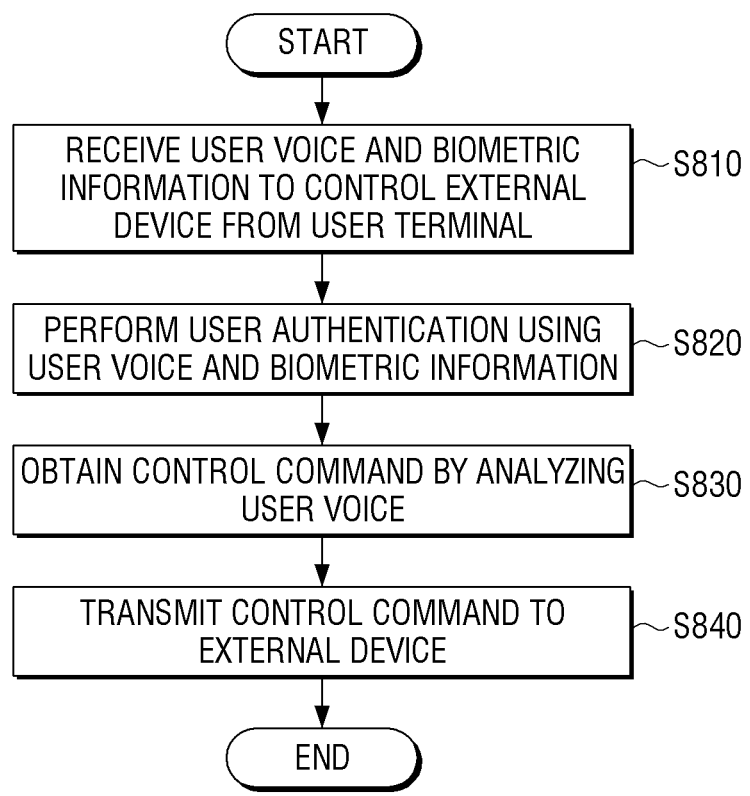

FIG. 8 is a flowchart illustrating an example method of controlling an electronic apparatus according to another embodiment.

The electronic apparatus 100 may receive a user voice and biometric information to control the external device 50 from the user terminal 200 (S810). In this example, the user voice may be received through the pre-authenticated application of the user terminal 200, and the biometric information may be encrypted by the first function.

The electronic apparatus 100 may perform user authentication using the received user voice and biometric information (S820). For example, the electronic apparatus 100 may perform user authentication by comparing the feature information obtained from the received user voice and the pre-stored feature information. In addition, the electronic apparatus 100 may decrypt the encrypted biometric information through the second function, and perform user authentication through the decrypted biometric information. In this example, if the user authenticated from the user voice is the same as the user authenticated through the biometric information, the electronic apparatus 100 may authenticate the corresponding user. If a user is not authenticated either by the authentication method of using the user voice or the authentication method of using biometric information, or users authenticated by the two authentication methods are different from each other, the electronic apparatus 100 may output a message indicating that the user is not authenticated.

If the user is authenticated, the electronic apparatus 100 may obtain a control command to control the external device 50 by analyzing the user voice (S830). In this example, the electronic apparatus 100 may not transmit the received user voice to an external server, obtain a text corresponding to the user voice through an automatic voice recognition module 410 stored in the memory 120, analyze the obtained text through the NLU module 420, and determine a device to be controlled and a control command.

The electronic apparatus 100 may transmit the control command to the external device 50 (S840). For example, the electronic apparatus 100 may transmit the determined control command to the external device 50 corresponding to the determined device to be controlled.

As described above, by controlling the external device 50 through the user voice by performing user authentication through the user voice and the biometric information, the security of a home network system can be improved.

Figure 9:
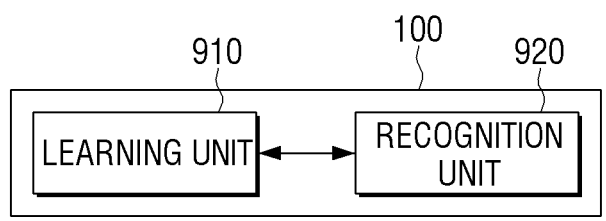
FIG. 9 is a block diagram illustrating an example configuration of an electronic apparatus using an AI module according to an embodiment.

FIG. 9 is a diagram illustrating an example configuration of an electronic apparatus using an AI module according to an embodiment.

Referring to FIG. 9, the electronic apparatus 100 may include at least one of a learning unit (e.g., including processing circuitry and/or executable program elements) 910 and a recognition unit (e.g., including processing circuitry and/or executable program elements) 920. The learning unit 910 and the recognition unit 920 of FIG. 9 may be implemented as software stored in the memory 130 of the electronic apparatus 100, but this is only an example. The learning unit 910 and the recognition unit 920 may be implemented as a separate exclusive hardware chip.

The learning unit 910 may include various processing circuitry and/or executable program elements and generate or train an AI model for authenticating a user using a user voice using training data. The learning unit 910 may generate a model which is trained to have a user recognition criteria using the collected training data. For example, the learning unit 910 may generate, train or update an AU model that can authenticate a user using a user voice using the user voice and information regarding the user as training data.

The recognition unit 920 may include various processing circuitry and/or executable program elements and obtain various information using predetermined data as input data of a trained AI model. For example, the recognition unit 920 may recognize (or estimate, infer) a user corresponding to a user voice using a user voice as input data of an AI model.

At least part of the learning unit 910 and at least part of the recognition unit 920 may be implemented as a software module or manufactured in the form of at least one hardware chip and mounted on the electronic apparatus 100. For example, at least one of the learning unit 910 and the recognition unit 920 may be manufactured in the form of a hardware chip dedicated to AI, or part of a conventional general purpose processor (e.g., CPU or application processor) or a dedicated graphic processor (e.g., GPU) and mounted on the aforementioned various electronic apparatuses. In this example, the dedicated hardware chip for AI is a dedicated processor specialized in probability calculation, and has a higher parallel processing performance than the conventional general purpose processor, thereby quickly processing computing operation in an AI field such as machine learning. If the learning unit 910 and the recognition unit 920 are implemented as a software module (or a program module including instructions), the software module may be stored in a non-transitory computer readable media which can be readable by a computer. In this example, the software module may be provided by an operating system (OA) or a predetermined application. Part of the software module may be provided by an OS and the remaining part may be provided by a predetermined application.

The learning unit 910 and the recognition unit 920 may be mounted on a single electronic apparatus or may be mounted on separate electronic apparatuses. For example, one of the learning unit 910 and the recognition unit 920 may be included in the electronic apparatus 100, and the other may be included in an external server. In addition, the learning unit 910 and the recognition unit 920 may provide the model information established by the learning unit 910 to the recognition unit 920 via wire or wirelessly, and the data input to the recognition unit 920 may be provided to the learning unit 910 as additional training data.

The term "a part" or "a module" used in the disclosure may include a unit including hardware, software, or firmware, or any combination thereof, and it may be interchangeably used with terms, for example, logic, a logical block, a component, or a circuit. Also, "a part" or "a module" may be a component including an integrated body or a minimum unit performing one or more functions or a portion thereof. For example, a module may consist of an application-specific integrated circuit (ASIC).

The various embodiments of the disclosure may be implemented as software including instructions stored in machine-readable storage media, which can be read by machines (e.g.: computers). The machines refer to devices that call instructions stored in a storage medium, and can operate according to the called instructions, and the devices may include an electronic device according to the aforementioned embodiments (e.g.: an electronic apparatus 100). Where an instruction is executed by a processor, the processor may perform a function corresponding to the instruction by itself, or using other components under its control. An instruction may include a code that is generated by a compiler or a code executable by an interpreter. A storage medium that is readable by machines may be provided in the form of a non-transitory storage medium. The 'non-transitory' storage medium may not include signals, and is tangible, but does not indicate whether data is stored in the storage medium semi-permanently or temporarily.

Also, according to an embodiment of the disclosure, methods according to the various embodiments described in the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program, or other component, according to various example embodiments, may be sequential, parallel, or both, executed iteratively or heuristically, or at least some operations may be performed in a different order, omitted, or other operations may be added.

While the disclosure has been illustrated and described with reference to various example embodiments, it will be understood that the various example embodiments are intended to be illustrative, not limiting. One of ordinary skill in the art will understand that various changes in form and detail may be made without departing from the spirit and scope of the disclosure as illustrated and set forth, for example, in the appended claims and equivalents thereof.

What is claimed is:

1. An electronic apparatus comprising:
a communication interface comprising communication circuitry;
a memory configured to store at least one command; and
a processor configured to execute the at least one command,
wherein the processor is configured to control the electronic apparatus to:
receive a user voice for controlling at least one of a plurality of external devices connected to the electronic apparatus from a user terminal through the communication interface,
perform user authentication by comparing feature information obtained from the user voice with feature information pre-stored in the memory,
obtain user information of authenticated user stored in the memory based on the user being authenticated, wherein the user information comprises preference information of the authenticated user,
determine an external device to be controlled from among the plurality of the external devices based at least on the user voice and the obtained user information, and determine a control command for controlling the determined external device based at least on the user voice and the preference information of the authenticated user,
based at least on one of the external device to be controlled and the control command being not determined, control the communication interface to transmit an inquiry message to the user terminal, and
based at least on the external device to be controlled and the control command being determined, control the communication interface to transmit the control command to the external device to be controlled.

2. The apparatus as claimed in claim 1, wherein the user terminal is
authenticated in advance through an application for controlling the external device installed on the user terminal.

3. The apparatus as claimed in claim 1, wherein the processor is configured to control the electronic apparatus to receive a user voice input while the application is executed on the user terminal through the communication interface.

4. The apparatus as claimed in claim 1, wherein the memory is configured to store feature information corresponding to each of a plurality of users, and
wherein the processor is configured to control the electronic apparatus to:
recognize one of the plurality of users by comparing feature information obtained from the received user voice with feature information corresponding to each of the plurality of users stored in the memory, and
obtain a control command based on information regarding the recognized user.

5. The apparatus as claimed in claim 1, wherein the processor is configured to control the electronic apparatus to receive biometric information of the user together with the user voice through the communication interface, and
perform user authentication based on the biometric information of the user.

6. The apparatus as claimed in claim 5, wherein the processor is configured to control the electronic apparatus to control the communication interface to transmit a message that the user is not authenticated to the user terminal based on a user not being authenticated based on at least one of the biometric information of the user and the user voice.

7. The apparatus as claimed in claim 5, wherein the biometric information of the user is encrypted and received by a first function, and
wherein the processor is configured to control the electronic apparatus to decrypt the received biometric information of the user through a second function corresponding to the first function.

8. The apparatus as claimed in claim 1, wherein the processor is configured to control the electronic apparatus to obtain a text corresponding to the user voice through a voice recognition module stored in the memory without transmitting the received user voice to an external server.

9. A method of controlling an electronic apparatus, comprising:
receiving a user voice for controlling at least one of a plurality of an external devices connected to the electronic apparatus from a user terminal;
performing user authentication by comparing feature information obtained from the user voice with pre-stored feature information;
obtaining user information of authenticated user stored in the electronic apparatus based on the user being authenticated, wherein the user information comprises a preference information of the authenticated user,
determine the external device to be controlled from among the plurality of the external devices based at least on the user voice and the obtained user information and obtaining a control command for controlling the determined external device based on the user voice and the preference information of the authenticated user;
based at least on one of the external device to be controlled and the control command being not determined, control the communication interface to transmit an inquiry message to the user terminal; and
based at least on the external device to be controlled and the control command being determined, transmitting the control command to the external device to be controlled.

10. The method as claimed in claim 9, wherein the user terminal is authenticated in advance through an application for controlling the external device installed on the user terminal.

11. The method as claimed in claim 9, wherein the receiving comprises receiving a user voice through a communication interface of the electronic apparatus, the user voice being input while the application is executed on the user terminal.

12. The method as claimed in claim 9, wherein the performing comprises recognizing one of the plurality of users by comparing feature information obtained from the received user voice with feature
information corresponding to each of the plurality of users, and
wherein the obtaining comprises obtaining a control command based on information regarding the recognized user.

13. The method as claimed in claim 9, wherein the receiving comprises receiving biometric information of the user together with the user voice through the communication interface, and
wherein the receiving comprises further performing user authentication based on the biometric information of the user.

14. The method as claimed in claim 13, further comprising:
transmitting a message informing that the user is not authenticated to the user terminal based on a user not being authenticated from at least one of the biometric information of the user and the user voice.

15. The method as claimed in claim 13, wherein the biometric information of the user is encrypted and received by a first function, the method further comprising:
decrypting the received biometric information of the user through a second function corresponding to the first function.

16. The method as claimed in claim 9, further comprising:
obtaining a text corresponding to the user voice through a voice recognition module stored in the electronic apparatus without transmitting the received user voice to an external server.

\* \* \* \* \*